United States Patent

Andersson et al.

[11] Patent Number: 5,578,803
[45] Date of Patent: Nov. 26, 1996

[54] CONTROL MODULE CONTAINING LOGIC CONTROLS FOR ELECTRIC WINDOW OPERATION IN MOTOR VEHICLES

[75] Inventors: Siv Andersson; Helen Bogren, both of Trollhättan, Sweden

[73] Assignee: Saab Automobile Aktiebolag, Sweden

[21] Appl. No.: 464,651

[22] PCT Filed: Feb. 10, 1994

[86] PCT No.: PCT/SE94/00107

§ 371 Date: Jun. 21, 1995

§ 102(e) Date: Jun. 21, 1995

[87] PCT Pub. No.: WO94/18684

PCT Pub. Date: Aug. 18, 1994

[30] Foreign Application Priority Data

Feb. 12, 1993 [SE] Sweden ................... 9300459

[51] Int. Cl.⁶ ........................................ H01H 9/00
[52] U.S. Cl. ........................................ 200/5 R; 200/6 R
[58] Field of Search ........................ 200/5 R, 6 R, 200/11 R, 339, 52 R; 180/333

[56] References Cited

U.S. PATENT DOCUMENTS

| | | | |
|---|---|---|---|
| 4,180,713 | 12/1979 | Gonzales | 200/52 R |
| 4,394,546 | 7/1983 | Harumatsu | 200/5 R |
| 4,611,102 | 9/1986 | Ishida | 200/5 R |
| 4,644,110 | 2/1987 | Watanabe et al. | 200/5 R |
| 4,701,629 | 10/1987 | Citroen | 200/52 R X |
| 4,857,677 | 8/1989 | Tanaka et al. | 200/5 R |
| 5,149,924 | 9/1992 | Priesemuth | 200/5 R |
| 5,286,078 | 2/1994 | Mottino et al. | 200/5 R X |
| 5,331,260 | 7/1994 | Ahmed | 200/5 R X |

FOREIGN PATENT DOCUMENTS 9010558 9/1990 WIPO.

*Primary Examiner*—J. R. Scott
*Attorney, Agent, or Firm*—Ostrolenk, Faber, Gerb & Soffen, LLP

[57] ABSTRACT

A control module (1) for servo assisted window operation in motor vehicles comprises a number of individual controls (2a–2d) for the respective side windows and also other controls (3, 4, 5) for actuating the locking out of rear seat controls for rear side windows, the release of jamming protection and the roof hatch servo. The control module (1) is preferably intended for placing on a central console (16) between the vehicle's front seats for easy access by the driver. Each individual control (2a–2d) for the side windows not only has an asymmetry of shape pointing towards the respective window but is also designed with first and second operating surfaces (12 and 13 respectively) which made it possible to press the control downwards towards and lift it upwards away from a horizontal baseplate (6) of the control module (1) so as to permit logical actuation of the controls (2a–2d) with respect to the movement of the windows. This makes it easy for the driver to identify the right control and operate it in the right direction without taking his eyes off the roadway.

17 Claims, 5 Drawing Sheets

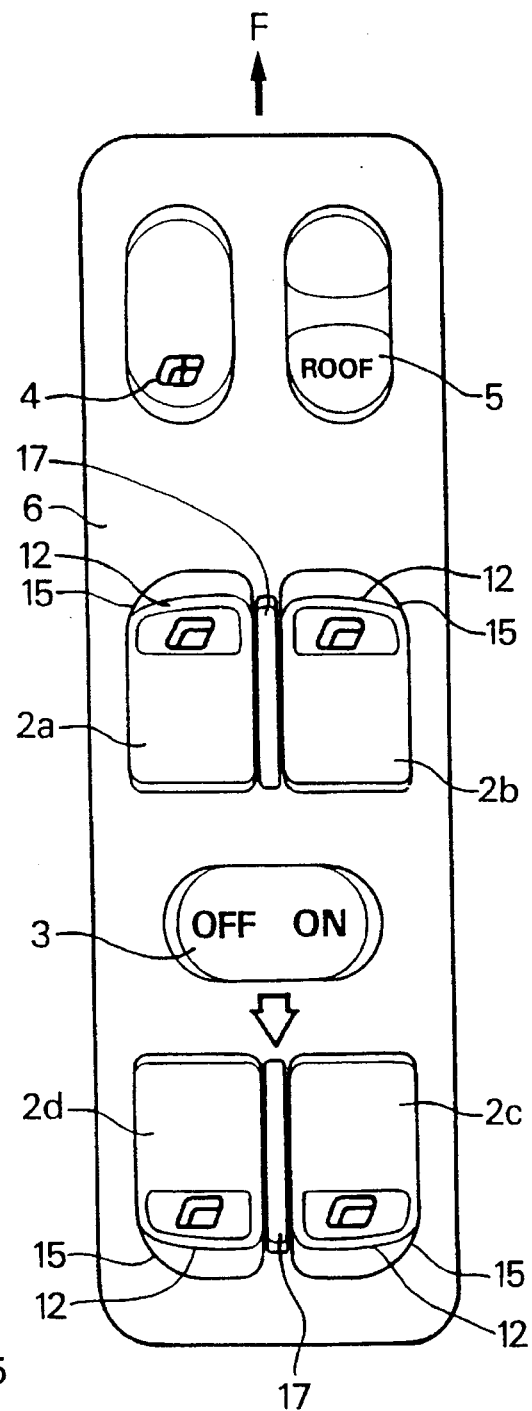
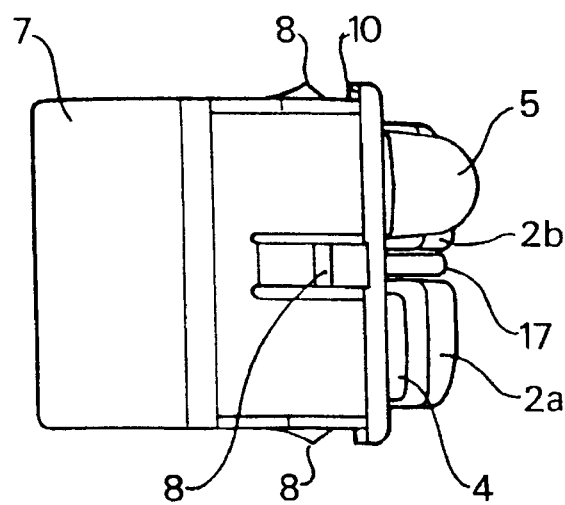
Fig. 2
Fig. 3

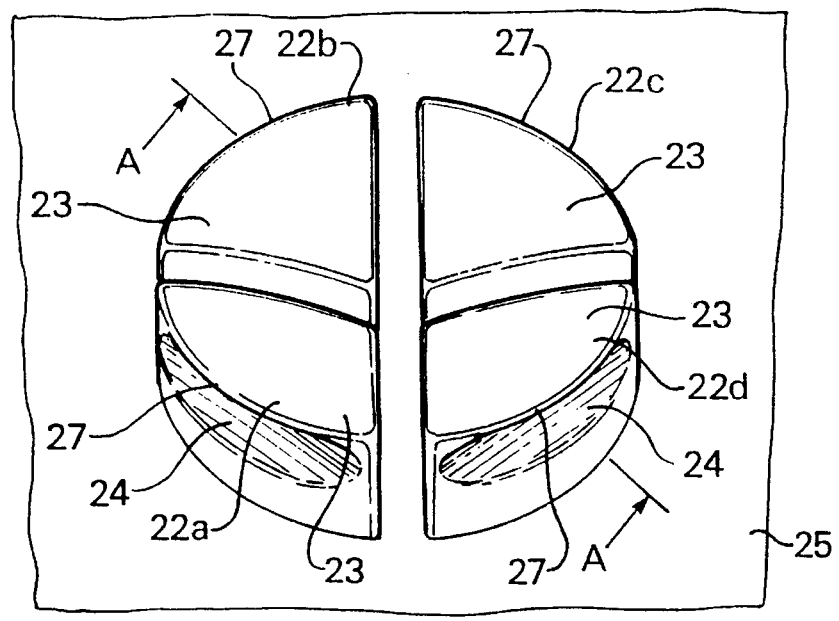
Fig. 4a
Fig. 4b
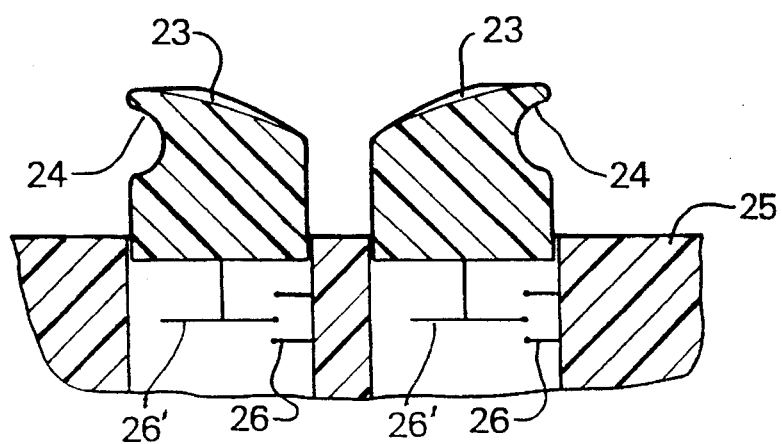

CONTROL MODULE CONTAINING LOGIC CONTROLS FOR ELECTRIC WINDOW OPERATION IN MOTOR VEHICLES

BACKGROUND OF THE INVENTION

The present invention refers to a control module for controlling electric windows wherein there is a respective actuator for each window and concerns particulars of the actuators and their arrangement.

In motor vehicles, endeavors are made to give the controls for various facilities a logical layout and control function so that the driver, without taking his eyes off the roadway, can find the controls and achieve the desired control function. Increased traffic safety is thereby achieved, since the driver has no need to look at the controls in order to identify the right control and the right direction of operation of the control. Operating the wrong control and thereby activating a piece of equipment or window other than that which the driver intended causes irritation which can affect traffic safety.

To this end, a practice previously known from U.S. Pat. No. 4,454,390 is to design the seat adjustment controls so that they resemble the seat adjusted in shape, and the various control segments have a direction of control movement corresponding to the seat adjustment. This makes it possible to identify by fingers, for example the control segment corresponding to the seat level and to press it down in order to achieve a corresponding lowering of the seat level.

A variant on this aspect of seat adjustment is known from U.S. Pat. No. 4,473,724, which also depicts a control module for windows. The control module for windows is designed such that a cluster or recess disposed in the vehicle includes two opposing vertical surfaces which are disposed in the longitudinal direction of the vehicle and correspond to its sides, where the controls are positioned on the surfaces corresponding to the positions of the side windows in the vehicle. This arrangement does however require a relatively large space for the control module. Another problem is that controls and control modules have as far as possible to be placed close together because available space is limited and because not all the free surfaces around the driver should be cluttered up with different control modules. Central consoles, for example, contain a multiplicity of other equipment which has likewise to be accommodated, such as ignition switch, hand brake, storage surfaces, and pockets etc.

A vehicle model sold in Sweden under the designation MAZDA 626 has on its central console a side window control module which utilises toggle switches disposed on an axis running in the longitudinal direction of the vehicle, with reversed control logic for the left and right side windows respectively. The window controls are grouped relatively close together in the corners of an imaginary rectangle in the horizontal plane on the central console so that the controls situated to the left of the vehicle centerline control the left side windows and the controls situated to the right of the vehicle centerline control the right side windows. Each window is raised by pressing the respective control down at its end situated furthest from the vehicle centerline and is lowered by pressing down the portion of the toggle switch which is situated closest to the vehicle centerline. This control module involves no logical control movements for closing/raising the windows, since the controls have to be pressed down to make the windows rise. Nor can the right control be identified unless the driver feels the whole or parts of the control module in addition to the control desired.

SUMMARY OF THE INVENTION

The present invention has the object of making possible a control module for servo assisted window operation in motor vehicles where the driver can open two windows on each side of the vehicle, a front one and a rear one, by operating controls disposed together in a horizontal plane which all provide logical control with regard to the control movements applied to the windows, and whereby each individual control has an individual shape which gives a direction indication with respect to the window controlled and is readily identifiable with one finger, thereby making it easier for the driver to find the right control and the right direction of operation without taking his eyes off the roadway.

A further object is that each individual control has a shape which is unique to it, thereby enabling the driver to reliably identify whether his finger is applied to the right control without having to feel other controls or the surroundings of the control module.

In accordance with the principal common object, the invention achieves this object through the features that each window actuator has a sloping orientation enabling its operation by pressing from above or lifting from below, and that the actuators either are directed toward their respective windows or are edge contoured toward their windows. Where there are four actuators for the front and rear side windows, they are arranged in a rectangular array. The actuators may be in the form of toggle switches that pivot toward and away from the base plate on which the switches are disposed.

Further features distinguishing the invention emerge from the ensuing description exemplifying a number of embodiments in accordance with the invention.

BRIEF DESCRIPTION OF THE DRAWINGS

The description is made with reference to the accompanying drawings in which:

FIG. 2 shows a view as seen from above in FIG. 1, FIG. 3 shows a view as seen from the left in FIG. 1, FIG. 4a shows a first alternative embodiment of the control module as seen in section from above, FIG. 4b shows a view along the section A—A in FIG. 4a, FIG. 5a shows another alternative embodiment of the control module as seen from above, FIG. 6b shows a view as seen from below in FIG. 6a.

DESCRIPTION OF PREFERRED EMBODIMENT EXAMPLES

Figure 1:
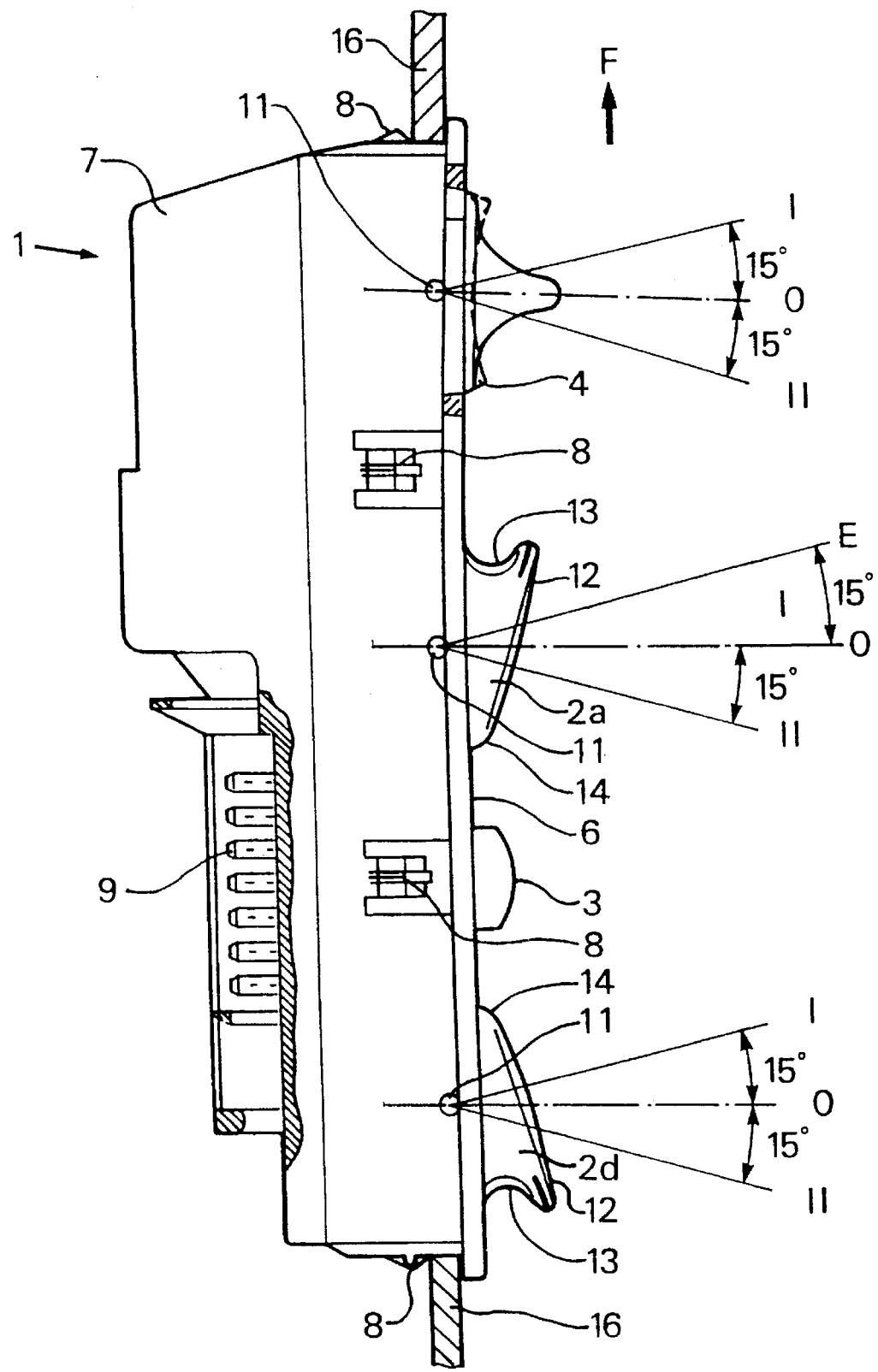
FIG. 1 shows a side view of a control module disposed in the longitudinal direction of a vehicle.

FIG. 1 depicts a control module 1 which is intended for fitting to a central console 16 between the front seats of a motor vehicle.

The control module 1 is preassembled as a unit and is intended to be pushed firmly into a recess provided in the central console 16. Once the control module has been fitted into the recess, an edge 10 of the module 1 is level with the upper surface of the central console 16, and the resilient locking catches 8 engage beneath the edges of the recess.

The control module consists of a baseplate 6 on which all the controls are situated, and a housing 7 which is accommodated in the recess provided in the central console 16 and houses all the electrical contacts which are operated by the controls. There is electrical connection to the respective servomotors via the connection pins 9.

The control module 1 is fitted so that the arrow F points towards the front of the vehicle and the baseplate 6 of the module is horizontal.

It is advantageous for the control module 1 to be fitted so as no be situated in the longitudinal direction of the vehicle just forward of the driver's shoulder and in the vertical direction mainly at the level of or just below the driving seat surface. This structure arrangement makes it easy for the driver to reach the control module 1 by stretching his hand downwards between the front seats.

All the controls required for the vehicle's servo assisted openable windows and its servo assisted roof hatch, if there is one, are situated on the control module 1.

The control 5 operates the skylight servo. In the case of a conventional skylight opened by the roof hatch sliding rearwards for opening and forwards for closing, a rearward movement of the control 5 causes a rearward opening movement of the roof hatch, and a forward movement of the control 5 results in a forward closing movement of the roof hatch. The control movements of the control 5 are thus logical with respect to the direction of movement of the roof hatch.

The control 5 has preferably a different design from the other controls, in which case it is advantageous for its shape to be as shown in FIG. 1. This shape gives a clear direction indication upwards towards the roof hatch.

The controls 2a, 2b, 2c and are situated in the respective corners of a rectangle formed in the baseplate and individually control the front left, front right, rear right, and rear left side windows respectively.

The controls 2a–2d take the form of toggle switches mounted on fulcrum pins 11 which are disposed transversely to the longitudinal direction of the vehicle and to the control module housing 7 under a central portion of the first operating surface 12 of the respective control.

It is usual conventional practice that the rear side windows can also be controlled by a second control (not shown) situated on the rear doors, or just below the rear side windows, so as to be readily accessible to rear seat passengers. Since in certain cases it may be desired to disconnect the operability of these controls, e.g. when there are children on the rear seat, the control module is provided with a lock-out button 3 controlling their operability.

The servomotors, most commonly electric motors, for the side windows are also provided with jamming protection, which is preferably designed such that when the current to the motors becomes too great they are switched off. Increased current may be due to something having become jammed between the window and the door frame while the window was closing, e.g. a finger, an arm or a head. In certain cases the jamming protection may be triggered, e.g. by ice forming on the window or if the window opening/closing mechanism sticks, without there being any actual danger to persons. To cater for this there is a control 4 for disconnecting the jamming protection. It is advantageous for the control 4 to be a monostable toggle switch mounted on a fulcrum pin 11. This control is resiliently operable from its neutral position at which the jamming protection is activated. Accordingly, the jamming protection can only be disconnected by operating the control 4 at the same time as operating the respective window control 2a–2d or the roof hatch control 5. The control 4 can be used to disconnect the jamming protection by pressing its front or rear portion as seen in the vehicle's forward direction F.

To enable the driver, quickly and without looking at the controls, to identify which side windows the respective controls 2a–2d operate, each control 2a–2d is provided with individual asymmetry of shape pointing towards the respective window. In the embodiment depicted in FIGS. 1–3 the differences in shape are twofold. The fact that the controls 2a–2d have a first operating surface 12 which slopes obliquely upwards and forwards relative to the control module baseplate 6 in the case of the actuators 2a, 2b of the front openable windows and obliquely upwards and rearwards in the case of the actuators 2c, 2d of the rear openable windows provides a shape indication of whether each control operates a front or a rear window.

The fact that the otherwise rectangular contour of each control has at one corner a deviant considerable rounding 15 which points towards the window operated by the control in question provides a further shape indication of control function pertaining to right or left side windows. It is advantageous for the rounding to have a radius of between 0.5 and 3 centimeters and preferably a radius exceeding ten times the radius of the other corners of the control on the edge contour of the first operating surface 12.

The driver can thus quickly feel whether his finger has found the right control.

For the respective side window controls 2a–2d to have logical control of the respective side windows, the former are provided with a second operating surface 13 situated at least partly under the portion of the first operating surface 12 of the actuators 2a–2d, and at the part of the first operating surface 12 situated at the greatest distance from the baseplate 6. It is advantageous for the second operating surface 13 to take the form of a recess which is situated on the end surface of the toggle switch and in which recess the driver can insert a finger. After inserting his finger the driver can then pull the toggle switch 2a–2d upwards so that it rotates about the respective fulcrum pin 11. Applying finger pressure to press down the first operating surface 12 causes instead an opposite rotation of the respective control 2a–2d.

Actuation of the controls shown in FIG. 1, which depicts them in the respective neutral position, i.e. the non servo operating position, by pressing the first or the second operating surface is opposed by spring loading which makes the control revert to the neutral position shown in FIG. 1 once actuation has ceased.

The embodiment depicted in FIGS. 1–3 constitutes a control module with controls placed close together in which each individual control for each individual window or roof hatch is easy to identify in itself without the driver having to feel the whole or parts of the control module. At the same time, the controls afford with respect to operating the side windows, and the roof hatch, a logical correspondence in the control operating direction.

Since the controls 2a–2d in FIGS. 1–3 take the form of toggle switches mounted on a pin 11 at the centre of each toggle switch, it is also possible for window raising to be achieved by depressing the rear end of the front side window controls 2a–2b or the front end of the rear side window controls 2c–2d. This can be utilised when the driver becomes more experienced with the controls or if simultaneous activation of the jamming protection release control 4 is required. In an alternative embodiment (not illustrated) the toggle switches for the side windows may be mounted on a fulcrum pin situated just under the portion of the first operating surface which is nearest to the baseplate 6, i.e. the rear end in the case of the front window controls and the front end in the case of the rear window controls. Such an embodiment eliminates the possibility of also being able to raise a window by depressing part of a control.

Permanent dividers 17 protruding from the baseplate 6 are preferably placed between the controls 2a, 2b for the front windows and between the controls 2c, 2d for the rear windows. The dividers 17 are so designed that the controls 2a–2d and their pins 11 are relieved of load if too great force/weight is imposed on the controls 2a–2d, as may for example occur when a child trying to climb onto the vehicle's front seat puts a foot on the central console and the control module fitted to it.

FIGS. 4a–4b illustrate schematically a first alternative arrangement of controls for side windows. In this case the controls 22a–22d take the form of simple push-buttons which may be pressed down by pressure on a first operating surface 23 but may also be pulled up from the baseplate 25 by pressure on a second operating surface 24 which is partly situated beneath the first operating surface 23. The operation of side windows by using this embodiment corresponds to that achieved by the embodiment depicted in FIGS. 1–3. As in FIG. 1, the controls are so disposed as to be situated in the corners of an imaginary rectangle and preferably have a twofold asymmetry of shape to indicate direction.

The edge contour 27 on the respective controls 22a–22d which form the corners of the imaginary rectangle have a deviant rounding corresponding to the embodiment in FIG. 1. The controls may also have an individual shape of the slope of the first operating surface 23 relative to the horizontal plane or the baseplate 25. This operating surface may slope from inside the imaginary rectangle upwards and outwards towards the rounded edge contour 27. Actuation of the respective servo control may be by conventional contacts 26 and 26' as schematically illustrated in FIG. 4b.

Figure 5A:
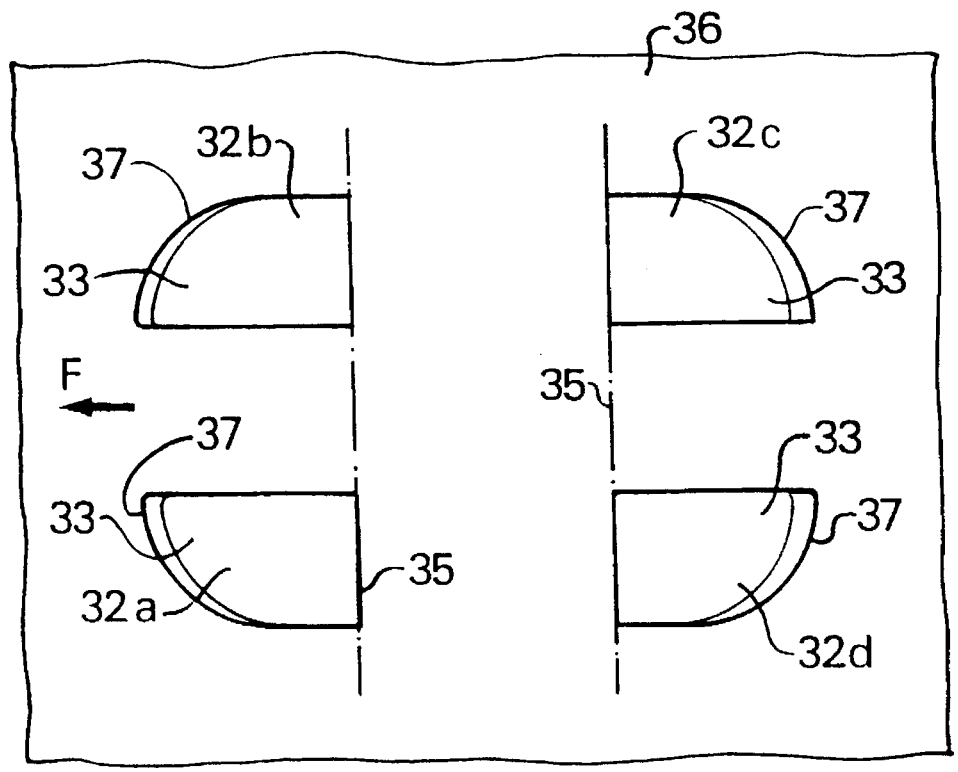
FIG. 5b shows a view as seen from below in FIG. 5a, FIG. 6a shows a third alternative embodiment of the control module as seen from above.
Figure 5B:
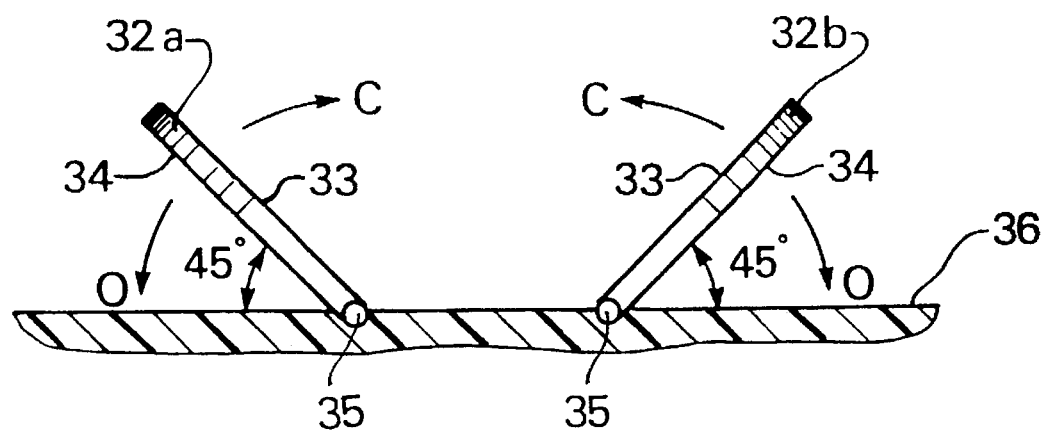

FIGS. 5a–5b illustrate schematically a second alternative arrangement of controls for side windows. In this case the controls 32a–32b take the form of planar elongated arms which slope relative to the control module baseplate 36 obliquely upwards towards F in the case of the actuators 32a, 32b for the front openable windows and obliquely upwards rearwards in the case of the actuators 32c, 32d for the rear openable windows, preferably forming an angle of approximately 45 degrees with the baseplate 36. The fact that the control arms 32a–32d take the form of toggle switches mounted on fulcrum pins 35 which are disposed transversely to the longitudinal direction of the vehicle means that the controls can open or lower the windows when a first operating surface 33 is pressed down in the direction O (open) and close or raise the windows on being pulled upwards by a finger applied to a second operating surface 34 in the direction C (close). The directional identification of the right and left sides is achieved in a manner corresponding to the embodiments in FIGS. 1–4b whereby the edge contour 37 on the respective controls 32a–32d which form the corners of the imaginary rectangle formed by the control arms has a corresponding deviant rounding.

Figure 6A:
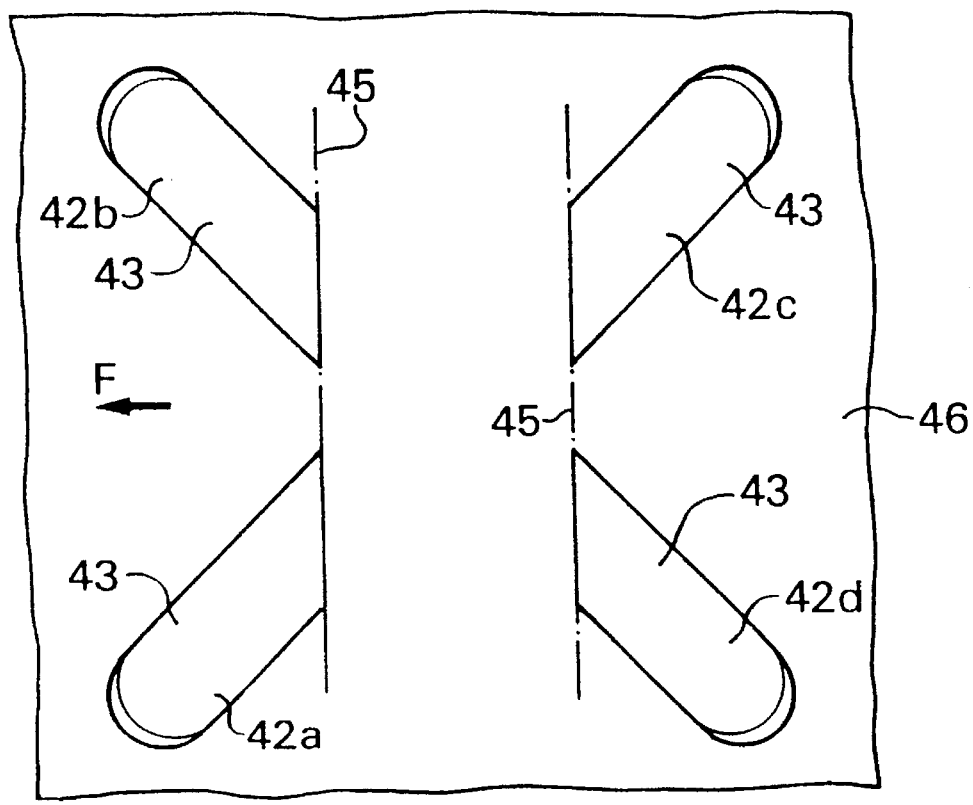
Figure 6B:
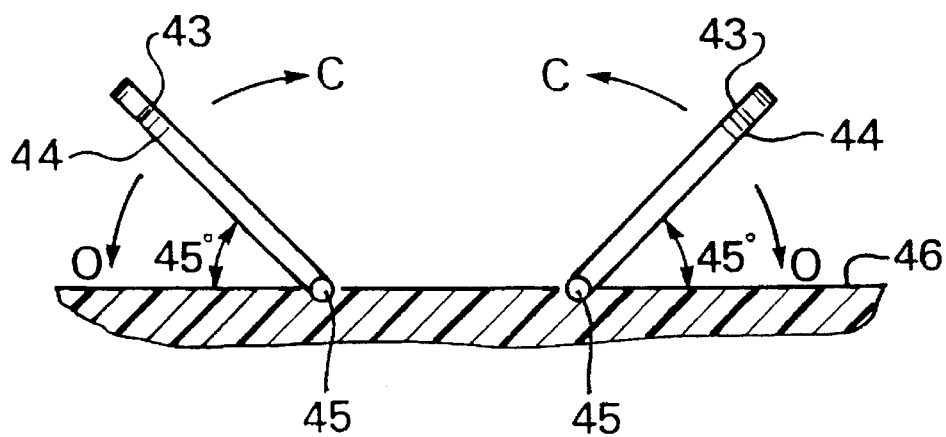

FIGS. 6a–6b illustrate schematically a third alternative arrangement of controls for side windows. In this case the control arms only deviate from the arrangement depicted in FIGS. 5a–5b in that the arms 42a–42d are set obliquely so as to point directly towards the respective windows. This means that the deviant roundings can be eliminated. In other respects the first operating surfaces 43, the second operating surfaces 44, the fulcrum pins 45 and the baseplate 46 conform to the corresponding parts in FIGS. 5a–5b.

All the alternative embodiments in FIGS. 4a–6b thus likewise incorporate an individual, preferably twofold, asymmetry of shape which points towards and thereby indentifies the window operated by the respective control, which has a first finger application location for making the actuator operate downwards towards the baseplate, and the respective actuator has a second finger application location for operating the control upwards away from the baseplate. This makes it easy for the finger to identify each control and provides logical operation of the side windows by the controls.

The invention is not limited to the embodiments exemplified in the above description but may also be utilised within the scope of the accompanying claims in a multiplicity of different modified embodiments. Such an embodiment may, for example, be a modification of the embodiments illustrated in FIGS. 1–3 and 5a–6b such that the toggle switches have fulcrum pins which run in the longitudinal direction of the vehicle. All the embodiments described in the drawings and the abovementioned modifications fall within the objects of the invention (presented in more detail under "Summary of the invention") and within the scope of one or more of the claims.

Nor is the invention limited to a control module which is placed on a central console, since it may also be employed fitted to the side of a door, in which case it is advantageous for it to be fitted to a horizontal surface on an armrest integrated with the side of the door.

We claim:

1. A control module for servo assisted window operation in a motor vehicle having at least one front and one rear openable side windows, the control module comprising:

a base plate to be positioned in the vehicle, a respective actuator for each of the openable side windows, each actuator controlling a switching function which controls operation of the respective window, the actuators being positioned on the base plate in respective positions that are related to the respective windows which the actuators actuate;

each actuator having a respective first operating surface; for the front side window, the first operating surface sloping obliquely upward from the base plate in the forward direction relative to the base plate; for the rear side window, the first operating surface sloping obliquely upward in the rearward direction relative to the base plate;

a second operating surface formed respectively on each actuator at least partly beneath that portion of the first operating surface of the actuator which is spaced furthest from the base plate so as to enable finger pressure to be applied on the second operating surface;

whereby finger pressure on the first operating surface depresses the respective actuator for moving the window in one direction while lifting of the second operating surface lifts the actuator for moving the window in the opposite direction.

2. The control module of claim 1, wherein each actuator is so arranged that finger pressure on the respective first operating surface depresses the actuator for corresponding opening of the respective window while finger pressure on the respective second operating surface lifts the actuator for corresponding closing of the respective window.

3. The control module of claim 2, wherein the front actuator is toward the front of the base plate and the rear actuator is toward the rear of the base plate positioned in the vehicle.

4. The control module of claim 3, being so positioned in the vehicle as to be situated on a central console between the front seats of the vehicle and at least substantially at a height corresponding to the level of the surface of the driver's seat in the vehicle.

5. The control module of claim 3, wherein the vehicle has a respective one of the front and rear openable side windows on each of the opposite sides of the vehicle and there is a respective one of the actuators on the base plate for each of the windows, the actuators being placed in a pattern on the base plate corresponding to the positions in the vehicle of the respective windows which each actuator actuates.

6. The control module of claim 5 wherein the actuators are arranged in a rectangular array, with the four actuators for the two front and rear windows being at the corners of the rectangle on the base plate.

7. The control module of claim 6, wherein the base plate is so shaped and oriented and the actuators are so placed on the base plate that each of the corners of the rectangle formed by the actuators are adapted to generally point toward the respective window operated by the actuator.

8. The control module of claim 7, wherein the first operating surface of each of the actuators has edges all around it and has a corner with a different, shape than the other edges defining the first operating surface, and that corner forms one corner of the rectangular array defined by the actuators.

9. The control module of claim 8, wherein the corner of each of the actuators is in the form of an extreme rounding generally in the plane of the actuator and with a radius of between 0.5 and 2 cm.

10. The control module of claim 6, wherein the first operating surface of each of the actuators has a corner with a different shape than the other edges defined in the first operating surface.

11. The control module of claim 6, wherein each of the actuators comprises a toggle switch, including a fulcrum pin lying in a plane parallel to the control module base plate and a switch element supported for pivoting around the fulcrum pin.

12. The control module of claim 11, wherein the fulcrum pin is oriented transversely to the longitudinal direction of the vehicle in a normal mounting of the base plate in the vehicle.

13. The control module of claim 12, wherein the toggle switch element and the first operating surface thereof are so positioned with respect to the fulcrum pin that the pin is disposed so as to support the actuator under a central portion of the first operating surface.

14. A control module for servo assisted window operation in a motor vehicle having one front and one rear openable side window on the left and right sides of the vehicle, the control module comprising:

a base plate to be positioned in the vehicle, a respective actuator for each of the four openable side windows, each actuator controlling a switching function which controls operation of the respective window with the actuators being positioned on the base plate in respective positions related to the respective windows of which the actuators actuate and the actuators being in a rectangular array;

the base plate being so shaped and oriented and the actuators being so placed on the base plate that the corners of the rectangle formed by the actuators point toward the respective windows operated by each of the actuators;

each actuator having a respective individual asymmetry of shape so that it points toward the respective window which the actuator is to control;

each actuator having a first finger application location for operating the actuator toward the base plate and having a second finger application location for operating the actuator upward away from the base plate.

15. The control module of claim 14, wherein each actuator has a respective operating surface with a respective asymmetry which comprises a respective slope of the first operating surface for the first finger application location on the actuator for pointing toward the respective window which the actuator controls; the first operating surface having edge contours around it, and that portion of the edge contour of the first operating surface that forms the respective corner of the rectangle that is defined by the actuators on the base plate has a different shape edge contour than the other edge contours of the first operating surface.

16. The control module of claim 15, wherein the portion of the edge contour forming a corner of the rectangle is in the form of an extreme rounding generally in the plane of the first operating surface and having a radius of between 0.5 and 2 cm.

17. The control module of claim 16, wherein on opposite sides of a line which divides the control module actuators into two groups of actuators, the actuators on opposite sides of the dividing line are mirror images of one another with respect to their shapes and orientations.

* * * * *